May 7, 1957 W. V. WOLFE 2,791,640

MAGNETIC SOUND RECORDING

Filed Nov. 27, 1953 3 Sheets-Sheet 1

INVENTOR.
Wallace V. Wolfe
BY Val R. Graham
ATTORNEY.

May 7, 1957 W. V. WOLFE 2,791,640

MAGNETIC SOUND RECORDING

Filed Nov. 27, 1953 3 Sheets-Sheet 2

INVENTOR.
Wallace V. Wolfe
BY [signature]
ATTORNEY.

May 7, 1957 W. V. WOLFE 2,791,640

MAGNETIC SOUND RECORDING

Filed Nov. 27, 1953 3 Sheets-Sheet 3

INVENTOR.
Wallace V. Wolfe
BY

ATTORNEY.

United States Patent Office 2,791,640

Patented May 7, 1957

2,791,640

MAGNETIC SOUND RECORDING

Wallace V. Wolfe, Encino, Calif., assignor to Radio Corporation of America, a corporation of Delaware Application November 27, 1953, Serial No. 394,779

11 Claims. (Cl. 179—100.2)

This invention relates to magnetic recording, and particularly to a system for maintaining the average reproduced level and frequency of a magnetic record in the magnetic medium the same as the average level and frequency of the original signal.

In the art of magnetic recording of sound and the reproduction thereof, record mediums of different types are used. These mediums may be wire, steel tape, or strips of magnetic particles adhering to a film base. In the use of the latter type of medium, variations in sensitivity of the medium occur which may be due to varying thicknesses of the magnetic material, varying densities thereof, and, in some instances, varying widths. Furthermore, on film carrying a plurality of narrow stripes of magnetic material, the sections of the stripes transversely of the film may vary in sensitivity with respect to each other. When this occurs, the average level and frequency of the signal when reproduced will vary with respect to the average level and frequency of the original signal, with the result that the original signal will not be reproduced. The present invention is directed to a system for automatically compensating not only for the amplitude variations due to the sensitivity of the film, but also, for variations in the frequency characteristic of the reproduced signal caused by the varying sensitivity of the magnetic medium.

In the past, the variations in sensitivity have been such that it has been necessary to calibrate each sound record medium before the recording is made, and then vary the amplitude and frequency characteristic of the signal as recorded. This is obviously time consuming and expensive, the present system providing the same results automatically as the signal or signals are recorded.

The principal object of the invention, therefore, is to facilitate the recording of sound on magnetic sound mediums.

Another object of the invention is to provide an improved magnetic sound recording system.

A further object of the invention is to provide an improved automatic magnetic sound recording system which compensates for variations in sensitivity of the sound track medium so that the average reproduced level and frequency characteristic will be the same as that of the original signal.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
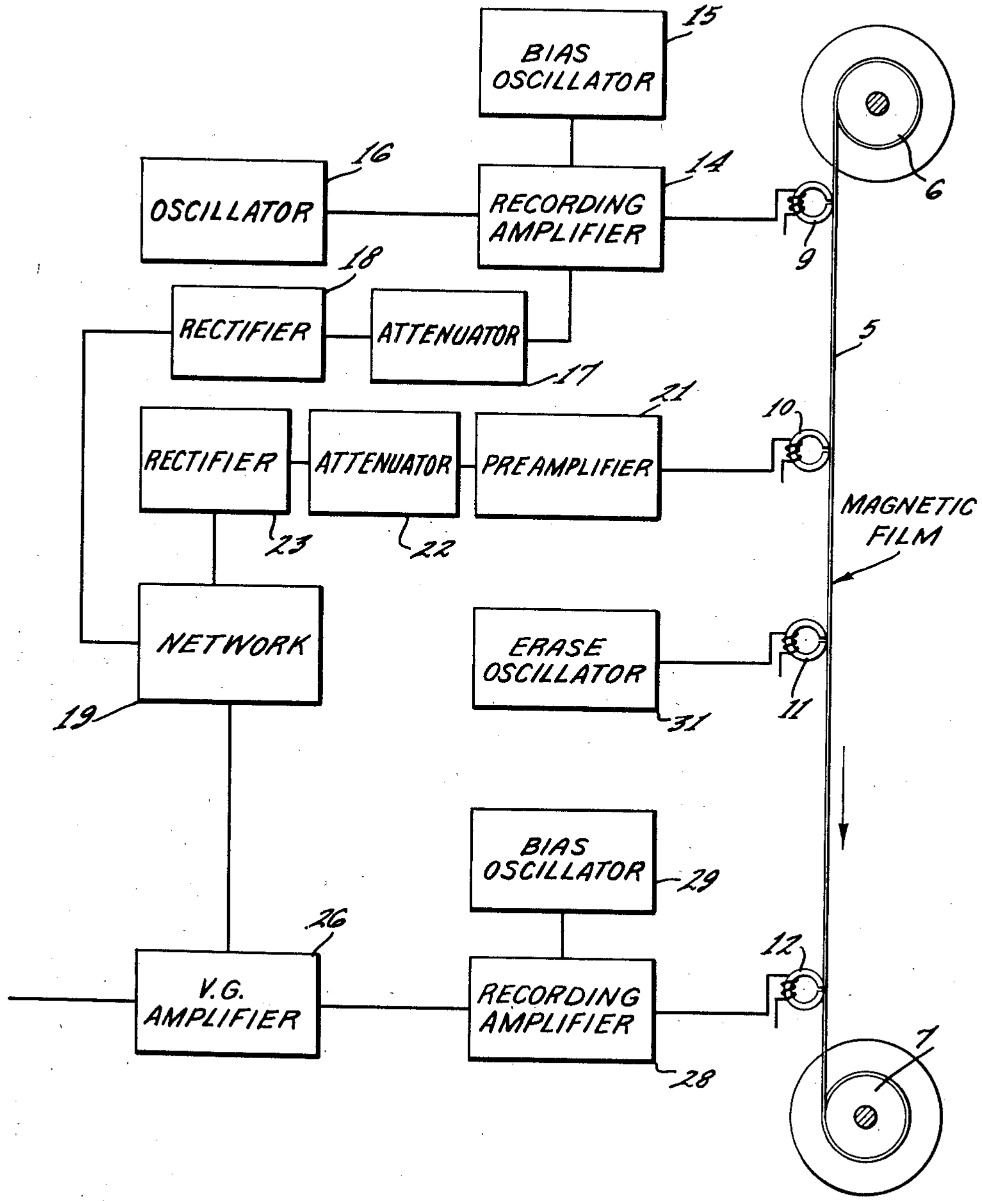
Fig. 1 is a diagrammatic view of a sound recording system embodying the invention which provides the same reproduced level of the signal as that of the signal being recorded.

Referring now to the drawings, and particularly Fig. 1, a magnetic film 5 is shown passing from a reel 6 to a reel 7 and advanced therebetween in any suitable manner. Positioned in contact with the magnetic medium 5 is a record head 9, a reproduce head 10, an erase head 11, and a record head 12. Impressed on the record head 9 is the output of a recording amplifier 14, which is fed from a bias oscillator 15, and a signal oscillator 16, which may be generating a tone having a frequency in the neighborhood of 1000 cycles. A portion of the output from the recording amplifier 14 is impressed on an attenuator 17 and then on a rectifier 18, which feeds a network 19.

The detector 10 is connected to a preamplifier 21 feeding an attenuator 22 connected to a rectifier 23, the output of which is also connected to the network 19. The network 19 is of the type shown in Fig. 4, and consists simply of a resistor 25, across which both rectifiers 18 and 23 are connected. The other connection to the resistor 25 is to the variable gain amplifier 26 which amplifies the regular audio signal finally desired on the magnetic medium 5.

The record head 12 for recording the final audio signal is fed from a recording amplifier 28 which is connected to a standard recording bias oscillator 29. The erase head 11 is connected to an erasing oscillator 31 to erase the control signal before the audio signal is recorded.

The operation of the above described system shown in Fig. 1 is that the tone of oscillator 16 is recorded by record head 9. A portion thereof is rectified at 18 and impressed on network 19. This signal, after recording, is detected at reproduce head 10 and rectified at 23 and impressed on the network 19 in opposite polarity to the voltage from rectifier 18. The attenuators 17 and 22 are placed in the input circuits to rectifiers 18 and 23, respectively, so that the output of the direct current voltage from the network 19 can vary both sides of normal, and thus, increase or decrease the gain of the variable gain amplifier 26. After these adjustments have been made, the amplitude of the signal to be recorded by head 12 is impressed on the magnetic medium 5 in accordance with the sensitivity of the medium. That is, should the sensitivity of the medium be lower at one point than the average sensitivity of the medium, the gain of amplifier 26 will be increased so that an increased level will be recorded by head 12. If the sensitivity is greater than normal, then the gain of amplifier 26 will be reduced. In this manner, therefore, the audio signal, when reproduced from the film 5, will have the same variation in average level as that of the original signal.

Although the above type of system is preferred, the attenuator 17, rectifier 18, and network 19 could be eliminated and the output of rectifier 23 directly connected to variable gain amplifier 26. In this variation, the reproduced level would directly control the gain of variable gain amplifier 26, although this briefer system would not provide as sensitive a control as that shown in Fig. 1.

Figure 3:
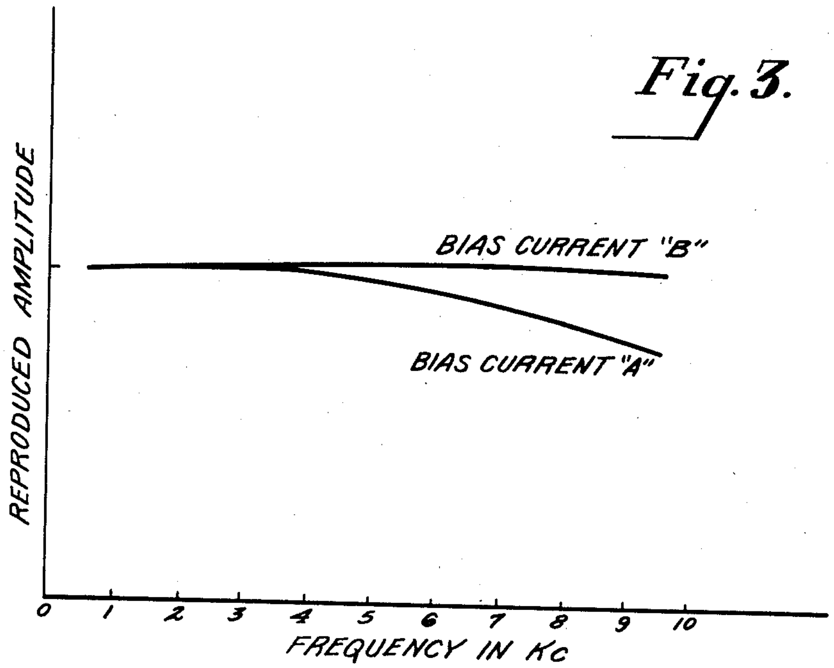
Fig. 3 is a graph showing the relationship between frequency and amplitude of the bias current used in magnetic recording.

In the recording of magnetic sound records, the amplitude of the reproduced signal is a function of the amplitude of the recording bias current as well as a function of the amplitude of the signal being recorded. In common practice, the amplitude of the bias current is relatively high, with the result that the amplitude of the reproduced signal is an inverse function of the amplitude of the bias current within normal limits. Furthermore, the amplitude of the high frequency signal is affected to a greater extent by changes in the amplitude of the bias current than is the case for lower frequencies. This is illustrated in Fig. 3, wherein the effect of a decrease in bias current on the frequency characteristic is shown by the comparison between the curves A and B. For instance, curve A may be considered a bias current of sixteen milliamperes, while curve B is a bias current of fourteen milliamperes. It is to be noted that there is very little change in the recorded frequency in the neighborhood of 1000 to 2000 cycles for both values of biasing currents, but there is a decrease in the reproduced level progressively as the frequency increases when the bias current has the higher value. This characteristic, therefore, can be used as a means for controlling the frequency characteristic of the reproduced signal.

Figure 2:
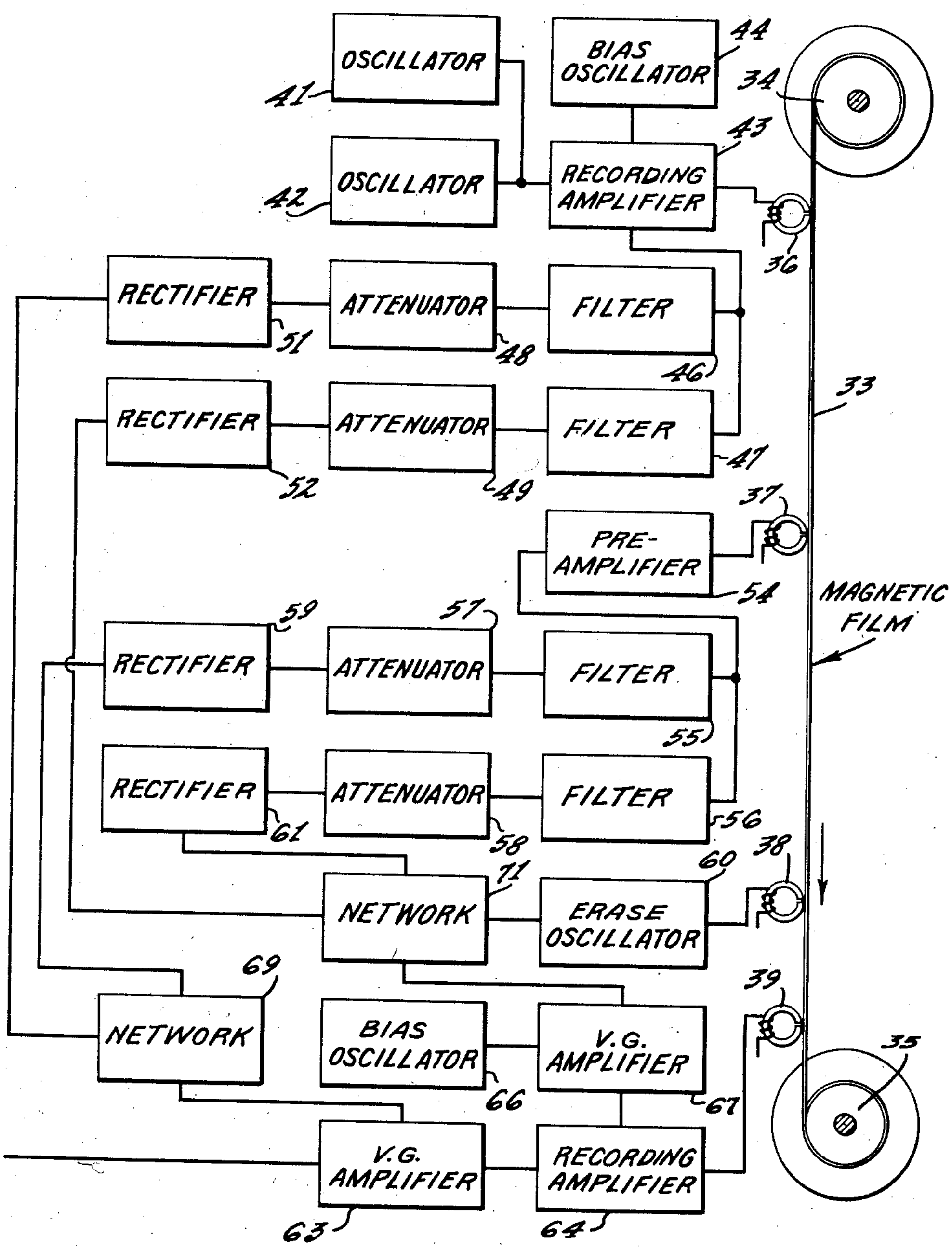
Fig. 2 is a diagrammatic view of a sound recording system which automatically compensates for the varying sensitivity of the magnetic medium so that the reproduced level and frequency characteristic of a signal are the same as those of the signal being recorded.

Referring now to Fig. 2, the system shown not only automatically controls the average amplitude of the signal, as illustrated in Fig. 1, but also controls the frequency characteristic. In this system, a magnetic film 33 passes from a supply reel 34 to a take-up reel 35. Positioned in contact with the film 33 is a record head 36, a pickup head 37, an erase head 38, and a record head 39.

The record head 36 is impressed with two tone control signals, one of which is generated by oscillator 41 and may be in the neighborhood of 1000 cycles, and the other is generated by oscillator 42 and may be in the neighborhood of 8000 cycles. These signals are combined in a recording amplifier 43 with a recording bias current from oscillator 44. A portion of the mixed signals is then impressed on two filters 46 and 47, which separate the 1000 cycle and 8000 cycle tone signals and impress them upon respective attenuators 48 and 49. The output of these attenuators is then impressed on respective rectifiers 51 and 52.

The two signals of 1000 cycles and 8000 cycles are detected by head 37 and impressed on a preamplifier 54, the output of which is impressed on a pair of filters 55 and 56 which separate the two 1000 and 8000 cycle tone signals into separate circuits. Filters 55 and 56 are connected to attenuators 57 and 58, respectively, which, in turn, are connected to rectifiers 59 and 61, respectively.

The audio signal to be finally recorded is impressed on a variable gain amplifier 63, then on a recording amplifier 64, and then on the record head 39. The audio signal is mixed with the high frequency bias current from an oscillator 66, after amplification by a variable gain amplifier 67. The erase head 38 is fed with energy from oscillator 60 to erase the control tones before the recording of the audio signal at 39.

Figure 4:
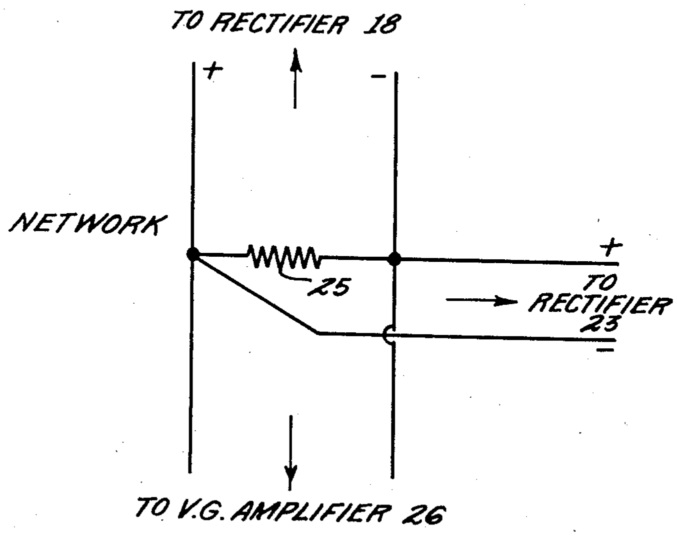
Fig. 4 is a schematic drawing of a combining network used in the invention.

To control the amplitude of the signal being recorded by head 39, the output of rectifier 51 with the 1000 cycle tone signal as recorded and the output of rectifier 59, representing the average amplitude of this tone signal as detected, are impressed on a network 69 corresponding to the network shown in Fig. 4. The output of network 69 is then impressed on the variable gain amplifier 63 to vary its gain as described in connection with Fig. 1.

To control the frequency characteristic of the reproduced signal, however, the output of rectifier 52, which varies in accordance with the average amplitude of the 8000 cycle tone signal, and the output of rectifier 61, which varies in accordance with the average amplitude of the detected 8000 cycle tone signal, are impressed on network 71, which network may also be similar to that shown in Fig. 4. The output of network 71 is, however, impressed on the variable gain amplifier 67 to vary the amplitude of the biasing current as impressed on recording amplifier 64. Thus, the signal recorded by head 39 will not only have impressed on the film 33 amplitude variations to provide a reproduced signal to correspond with the average amplitude variations of the original signal, but also, will impress variations in bias current which will maintain the same reproduced frequency characteristic as that of the original signal. Thus, it is unnecessary to calibrate each magnetic film or stripe of magnetic material used on a single film base, since the signal being recorded on one or more stripes will be impressed thereon at an amplitude and at a value of biasing current to maintain the reproduced signal the same as the original signal being recorded.

I claim:

1. A system for recording a magnetic record for reproduction at the same average level as that of the original signal on a record medium of varying sensitivity comprising a tone signal source, means for recording a tone signal from said source on said magnetic record medium, detecting means for said tone signal on said record, means for combining said tone signal as recorded with said tone signal as detected to obtain a current varying with the difference between said signals, a signal recording means, and means under control of said difference current for varying the amplitude of said signal as recorded.

2. A system in accordance with claim 1, in which said last mentioned means includes a variable gain amplifier whose gain is varied by said difference current.

3. A system in accordance with claim 1, in which said first mentioned recording means includes a high frequency bias oscillator and said combining means includes a rectifier for said first recorded signal, a second rectifier for said detected signal, and a balancing network connected to said rectifiers for providing said difference current.

4. A system for recording a magnetic record for reproduction at the same average level as that of the original signal on a record medium of varying sensitivity comprising a tone signal source, means for recording a tone signal from said source on said magnetic record medium, detecting means for said tone signal on said record, means for combining said tone signal as recorded with said tone signal as detected to obtain a current varying with the difference between said signals, an audio signal recording means, means under control of said difference current for varying the amplitude of said audio signal as recorded, a second tone signal source of a different frequency from that of said first tone signal source, means for simultaneously combining said second tone signal with said first tone signal, means for separating said tone signals after combination, said detecting means also detecting said second tone signal, means for separating said tone signals after detection, said audio signal recording means including a bias oscillator, a variable gain amplifier for said audio signal, and a variable gain amplifier for said oscillator current, and means for controlling one of said variable gain amplifiers with one tone signal and said other variable gain amplifier with said other tone signal.

5. A system for recording a magnetic record for reproduction at the same average level as the original signal and with the same frequency characteristic as said original signal comprising a pair of signal sources of different frequencies, means for combining and recording signals from said pair of sources on said magnetic medium, means for filtering the currents of said sources after combination into separate circuits, means for rectifying said currents in said circuits, means for detecting said signals from said magnetic medium, means for filtering the currents of said signals into separate circuits, means for rectifying said currents, means for combining one of said first mentioned rectified currents and one of said second mentioned rectified currents to obtain a first difference current, and means for combining the other of said first mentioned rectified currents and the other of said second mentioned rectified currents to obtain a second difference current, a source of audio signals for recording on said medium, a source of bias current, means for controlling the amplitude of said audio signal as recorded with said first difference current, and means for controlling the amplitude of said bias current with said second difference current.

6. A system in accordance with claim 5, in which said last mentioned means includes a variable gain amplifier controlled by said first difference current and a second variable gain amplifier for controlling said bias current by said second difference current.

7. A system for recording a record of a signal which upon reproduction will have the same average amplitude variations as the original signal on a magnetic medium of varying sensitivity comprising a tone generator, means for recording the tone signal from said generator on said medium, means for rectifying a portion of said tone signal, means for detecting said tone signal as recorded, means connected to said detecting means for rectifying said tone signal as detected, a balancing network on which said rectified signals are impressed in opposite polarity, means for erasing said tone signal after detection, means for recording said signal on said medium, and means connecting said last mentioned means with said balancing network for varying the amplitude of said signal as recorded on said medium.

8. A system in accordance with claim 7, in which said means for recording said audio signal includes a variable gain amplifier, the gain thereof being increased by the current from said balancing network when the sensitivity of said medium is below average and for decreasing the gain of said amplifier when the sensitivity of said recording medium is above average.

9. A system for obtaining a reproduced signal with the same characteristics as the original signal when said original signal is recorded on a magnetic medium of varying sensitivity comprising a record head for said audio signal, a magnetic erasing head positioned before said record head, a magnetic reproduce head positioned before said erase head, a record head positioned before said reproduce head, a pair of tone signal sources of different frequencies, a source of recording bias current for said tone signal sources, means for combining said tone signal sources with the recording bias current for impression on said last mentioned record head, means for separating said tone signal sources into separate circuits after the combination thereof, individual means in each of said separate circuits for rectifying the tone signals from said sources, means connected to said reproduce head for separating the detected tone signals into two separate circuits, individual means in each of said last mentioned circuits for rectifying said tone signals, a pair of balancing networks, one of said networks being connected to each rectifier receiving a tone signal of the same frequency and the other of said networks being connected to the other rectifiers for the tone signal of the other frequency, and audio signal recording means connected to said first mentioned record head and to said networks for varying the amplitude and frequency characteristic of said audio signal in accordance with the sensitiveness of said magnetic medium as determined by said last mentioned record head and said reproduce head.

10. A system in accordance with claim 9, in which said last mentioned means includes a variable gain amplifier connected to said first mentioned network, a bias oscillator, and a variable gain amplifier connected to said bias oscillator and to said second mentioned network for varying the amplitude of the current from said bias oscillator in accordance with the sensitiveness of said magnetic film.

11. A system in accordance with claim 9, in which said networks include a resistor across which the outputs of said respective rectifiers connected thereto are impressed in opposite polarities.

References Cited in the file of this patent

UNITED STATES PATENTS 2,649,506 Gayford -------------- Aug. 18, 1953

FOREIGN PATENTS 693,664 Germany --------------- July 16, 1940